(12) United States Patent
 LaRock et al.

(10) Patent No.: US 11,119,828 B2
(45) Date of Patent: *Sep. 14, 2021

(54) DIGITAL PROCESSING SYSTEM FOR EVENT AND/OR TIME BASED TRIGGERING MANAGEMENT, AND CONTROL OF TASKS

(71) Applicant: Bank of America Corporation, Charlotte, NC (US)

(72) Inventors: Leslie LaRock, Davidson, NC (US); Kenneth Cox, Ooltewah, TN (US)

(73) Assignee: Bank of America Corporation, Charlotte, NC (US)

(*) Notice: Subject to any disclaimer, the term of this patent is extended or adjusted under 35 U.S.C. 154(b) by 221 days.

This patent is subject to a terminal disclaimer.

(21) Appl. No.: 16/516,491

(22) Filed: Jul. 19, 2019

(65) Prior Publication Data
US 2019/0340036 A1 Nov. 7, 2019

Related U.S. Application Data

(63) Continuation of application No. 15/483,212, filed on Apr. 10, 2017, now Pat. No. 10,409,638.

(51) Int. Cl.
*G06F 9/46* (2006.01)
*G06F 9/50* (2006.01)
*G06F 9/48* (2006.01)

(52) U.S. Cl.
CPC .......... *G06F 9/5066* (2013.01); *G06F 9/4881* (2013.01); *G06F 9/5088* (2013.01); *G06F 2209/486* (2013.01); *G06F 2209/5022* (2013.01)

(58) Field of Classification Search
None
See application file for complete search history.

(56) References Cited

U.S. PATENT DOCUMENTS

| 4,980,824 A | * | 12/1990 | Tulpule | G06F 9/4881 |
| | | | | 718/106 |
| 5,317,689 A | | 5/1994 | Nack et al. | |

(Continued)

OTHER PUBLICATIONS

Devi et al; Load Balancing in Cloud Computing Environment Using Improved Weighted Round Robin Algorithm for Nonpreemptive Dependent Tasks; Hindawi, 2016 (Year: 2016).*

(Continued)

*Primary Examiner* — Bing Zhao
(74) *Attorney, Agent, or Firm* — Banner & Witcott, Ltd.; Michael A. Springs

(57) ABSTRACT

A method, apparatus, computer-readable medium, and/or system may comprise a user device configured to receive, from a user, a selection of a plurality of dependent computing tasks for a first computing task. The user device may transmit, to a computing device, the selection of the plurality of dependent computing tasks for the first computing task. The system may comprise a computing device comprising a processor and memory storing computer-executable instructions that, when executed by the processor, cause the computing device to receive, from the user device, the selection of the plurality of dependent computing tasks for the first computing task. The computing device may store, at a task registry and in association with the first computing task, an indication of the plurality of dependent computing tasks. The computing device may cause transmission of the first computing task from the task registry to a task queue. In some aspects, a dependent task queue may comprise the plurality of dependent computing tasks. The computing device may determine whether the plurality of dependent computing tasks has been executed. If the plurality of dependent computing tasks has been executed, the computing device may determine one or more nodes for executing the first computing task and cause transmission of the first (Continued)

computing task from the task queue to the one or more nodes for executing the first computing task. The one or more nodes may be configured to execute the first computing task in response to receiving the first computing task from the task queue.

22 Claims, 5 Drawing Sheets

(56) References Cited

U.S. PATENT DOCUMENTS

| | | | |
|---|---|---|---|
| 5,530,861 | A | 6/1996 | Diamant et al. |
| 5,832,262 | A | 11/1998 | Johnson et al. |
| 5,875,306 | A | 2/1999 | Bereiter |
| 5,878,431 | A | 3/1999 | Potterveld et al. |
| 5,924,097 | A | 7/1999 | Hill et al. |
| 6,112,225 | A | 8/2000 | Kraft et al. |
| 6,195,097 | B1 | 2/2001 | Shrader et al. |
| 6,247,103 | B1 | 6/2001 | Kern et al. |
| 6,282,697 | B1 | 8/2001 | Fables et al. |
| 6,393,537 | B1 | 5/2002 | Kern et al. |
| 6,678,714 | B1 | 1/2004 | Olapuralh et al. |
| 6,857,020 | B1 | 2/2005 | Chaar et al. |
| 6,954,220 | B1 | 10/2005 | Bowman-Amuah |
| 7,194,695 | B1 | 3/2007 | Racine et al. |
| 7,299,274 | B2 | 11/2007 | Rajarajan et al. |
| 7,386,801 | B1 | 6/2008 | Horvitz et al. |
| 7,536,650 | B1 | 5/2009 | Robertson et al. |
| 7,546,486 | B2 | 6/2009 | Slik et al. |
| 7,603,440 | B1 | 10/2009 | Grabowski et al. |
| 8,973,002 | B1 | 3/2015 | Grammas et al. |
| 2003/0182349 | A1* | 9/2003 | Leong .............. G06F 3/0689 718/100 |
| 2011/0131448 | A1 | 6/2011 | Vasil et al. |
| 2013/0145371 | A1 | 6/2013 | Brunswig et al. |
| 2016/0078361 | A1 | 3/2016 | Brueckner et al. |

OTHER PUBLICATIONS

Lyberis et al; Myrmics: Scalable, Dependency-aware Task Scheduling on Heterogeneous Manycores; arXiv, Jun. 14, 2016 (Year: 2016).*
Oracle Database 12c—Dated Mar. 24, 2017—https://www.oracle.com/database/index.html.
Java (Programming Language)—Wikipedia—Dated Mar. 24, 2017—https://en.wikipedia.org/wiki/Java_(programming_language).
"Mainframe Computer;" Wikipedia—Dated Mar. 24, 2017—https://en.wikipedia.org/wiki/Mainframe_computer.
"Mainfame Definition from PC Magazine Encyclopedia;" Dated Mar. 24, 2017—http://www.pcmag.com/encyclopedia/term/46536/mainframe.
"Midrange Computer;" Wikipedia—Dated Mar. 24, 2017—https://en.wikipedia.org/wiki/Midrange_computer.
"Midrange Computer Definition from PC Magazine Encyclopedia;" Dated Mar. 24, 2017—http://www.pcmag.com/encyclopedia/term/47026/midrange-computer.
Feb. 5, 2019—(U.S.) Office Action—U.S. Appl. No. 15/483,212.

* cited by examiner

Task Management and Control System

Signed is as USER

HOME

Task Management and Control System

Please enter information for task.

New Task? [No ⌄] — 502, 504

Task ID [TASK123456]

Task Description [This task is used to execute action 1] — 508

Task Event Trigger [TASK1357 ⌄] — 510

More?

Task Time Trigger [MM:DD:YY, HH:MM:SS ⌄] — 512

[Submit] — 514

DIGITAL PROCESSING SYSTEM FOR EVENT AND/OR TIME BASED TRIGGERING MANAGEMENT, AND CONTROL OF TASKS

CROSS-REFERENCE TO RELATED APPLICATION

This application is a continuation of U.S. patent application Ser. No. 15/483,212 entitled "Digital Processing System for Event and/or Time Based Triggering, Management, and Control of Tasks" filed on Apr. 10, 2017. This application claims priority to and the benefit of the above-identified application which is fully incorporated by reference herein in its entirety.

TECHNICAL FIELD

One or more aspects of the disclosure generally relate to computing devices, computing systems, and computer software. In particular, one or more aspects of the disclosure generally relate to computing devices, computing systems, and computer software that may be used to trigger, manage, and/or control computing tasks based on events and/or time factors

BACKGROUND

Computing systems may need to perform numerous computing tasks. However, performance of these tasks by existing systems may be time consuming, or existing sequential execution of tasks may result in one or more tasks not being performed. What is needed is a more efficient and accurate way of executing computing tasks, such as sequential execution of tasks.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

A method, apparatus, computer-readable medium, and/or system may comprise a user device configured to receive, from a user, a selection of a plurality of dependent computing tasks for a first computing task. The user device may transmit, to a computing device, the selection of the plurality of dependent computing tasks for the first computing task. The system may comprise a computing device comprising a processor and memory storing computer-executable instructions that, when executed by the processor, cause the computing device to receive, from the user device, the selection of the plurality of dependent computing tasks for the first computing task. The computing device may store, at a task registry and in association with the first computing task, an indication of the plurality of dependent computing tasks. The computing device may cause transmission of the first computing task from the task registry to a task queue. In some aspects, a dependent task queue may comprise the plurality of dependent computing tasks. The computing device may determine whether the plurality of dependent computing tasks has been executed. If the plurality of dependent computing tasks has been executed, the computing device may determine one or more nodes for executing the first computing task and cause transmission of the first computing task from the task queue to the one or more nodes for executing the first computing task. The one or more nodes may be configured to execute the first computing task in response to receiving the first computing task from the task queue.

In some aspects, determining whether the plurality of dependent computing tasks has been executed may comprise determining whether execution of the plurality of dependent computing tasks has been completed by one or more nodes. Determining whether the plurality of dependent computing tasks has been executed may additionally or alternatively comprise determining whether execution of the plurality of dependent computing tasks has been initiated by one or more nodes.

In some aspects, the memory of the computing device may store computer-executable instructions that, when executed by the processor, cause the computing device to cause transmission of the plurality of dependent computing tasks from the task registry to the dependent task queue. Causing the transmission of the first computing task from the task registry to the task queue may be performed before causing the transmission of the plurality of dependent computing tasks from the task registry to the dependent task queue.

In some aspects, the memory of the computing device may store computer-executable instructions that, when executed by the processor, cause the computing device to determine whether the computing device has received a manual override from the user device. If the computing device has received the manual override from the user device, the computing device may determine one or more nodes for executing the first computing task and may cause transmission of the first computing task from the task queue to the one or more nodes for executing the first computing task.

In some aspects, the memory of the computing device may store computer-executable instructions that, when executed by the processor, cause the computing device to determine whether a current time exceeds a scheduled time to execute the first computing task. If the current time exceeds the scheduled time to execute the first computing task, the computing device may determine one or more nodes for executing the first computing task and may cause transmission of the first computing task from the task queue to the one or more nodes for executing the first computing task.

In some aspects, the memory of the computing device may store computer-executable instructions that, when executed by the processor, cause the computing device to determine one or more nodes for executing the first computing task. The computing device may determine, based on the one or more nodes for executing the first computing task, an amount of time to complete execution of the first computing task. The computing device may determine, based on the amount of time to complete execution of the first computing task, a latest time to execute the first computing task.

BRIEF DESCRIPTION OF THE DRAWINGS

The present disclosure is illustrated by way of example and not limited in the accompanying figures in which like reference numerals indicate similar elements and in which:

FIG. 5 illustrates an example user interface for triggering, managing, and/or controlling computing tasks based on events and/or time factors in which various aspects of the disclosure may be implemented.

DETAILED DESCRIPTION

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized, and that structural and functional modifications may be made, without departing from the scope of the present claimed subject matter.

Figure 1:
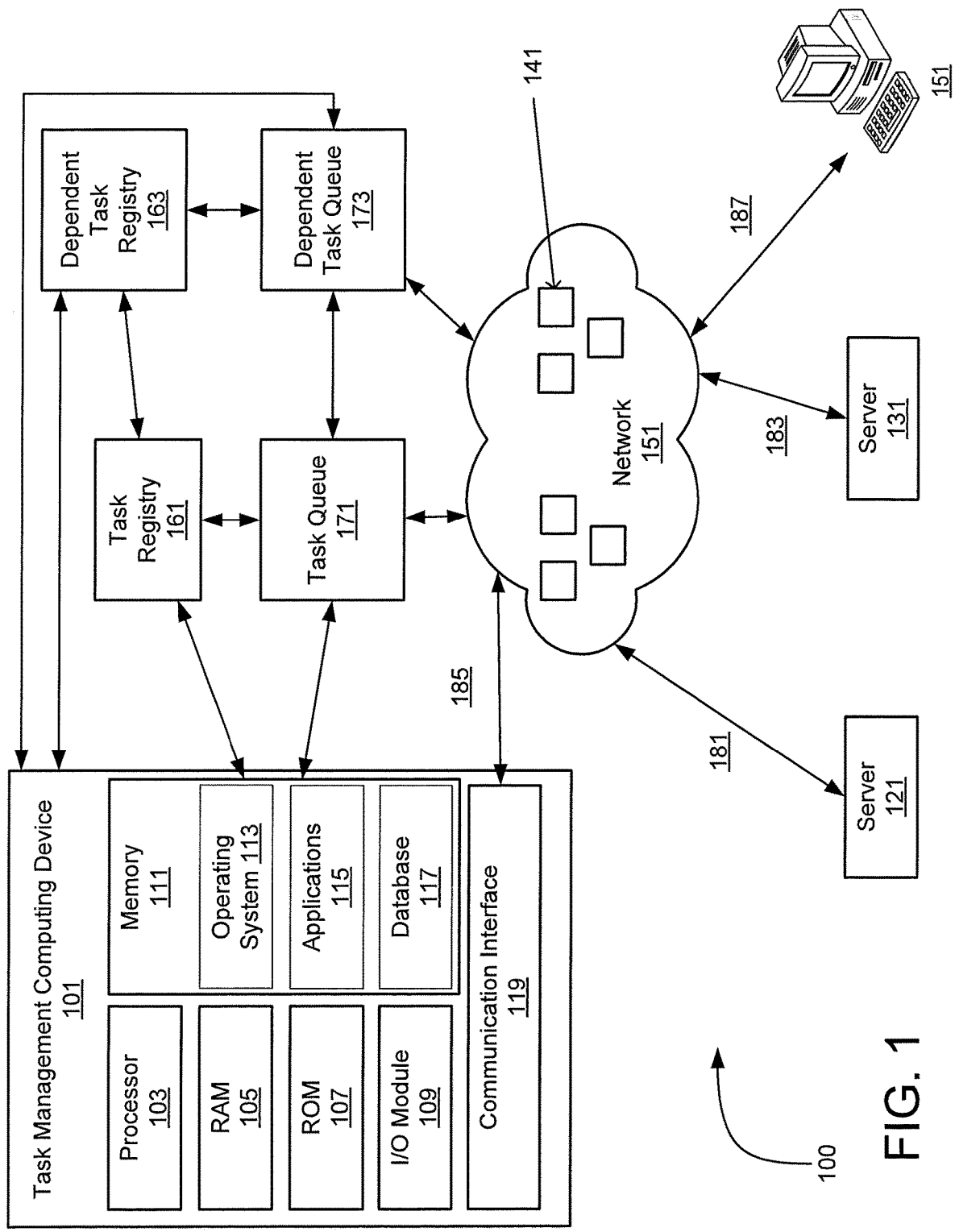
FIG. 1 illustrates an example operating environment in which various aspects of the disclosure may be implemented.

FIG. 1 illustrates an example operating environment in which various aspects of the disclosure may be implemented. An illustrative system 100 for implementing methods according to the present disclosure is shown. System 100 may include a task management computing device 101. As will be described in further detail below, the computing device 101 may facilitate triggering, managing, and/or controlling computing tasks based on events and/or time factors. In some aspects, the system 100 may facilitate triggering, managing, and/or controlling tasks in a midrange server environment, which may result in more efficient and faster interfacing and communication of task data with one or more servers 121 or 131. Moreover, and as will be described in further detail below, use of one or more server nodes and/or server node clusters in a network 151, such as with load balancing and load management services, may result in faster execution of tasks. Exemplary tasks may include end of day processes, end of day data (e.g., financial) totals, database purge, or other computing tasks.

The computing device 101 may have a processor 103 for controlling overall operation of the computing device and its associated components, including for example random access memory (RAM) 105, read-only memory (ROM) 107, input/output (I/O) module 109, and memory 111. I/O module 109 may include, e.g., a microphone, mouse, keypad, touch screen, scanner, optical reader, and/or stylus (or other input device(s)) through which a user of computing device 101 may provide input, and may also include one or more of a speaker for providing audio output and a video display device for providing textual, audiovisual, and/or graphical output. Software may be stored within memory 111 and/or other storage to provide instructions to processor 103 for enabling computing device 101 to perform various functions. For example, memory 111 may store software used by the computing device 101, such as an operating system 113, application programs 115, and an associated database 117. Additionally or alternatively, some or all of the computer executable instructions for computing device 101 may be embodied in hardware or firmware (not shown).

The computing device 101 may operate in a networked environment supporting connections to one or more other computers, such as server 121 and server 131 (or other devices). The servers 121 and 131 may comprise servers that include any or all of the elements described above with respect to the computing device 101. The network connections depicted in FIG. 1 include a local area network (LAN), and a wide area network (WAN), but may also include other networks. The computing device 101 may communicate with other computing devices using a communication interface 119 or other network interface for establishing communications over a LAN and/or a WAN, such as the Internet. It will be appreciated that the network connections shown are illustrative and other means of establishing a communications link between the computers may be used. The existence of any of various well-known protocols such as TCP/IP, Ethernet, FTP, HTTP, HTTPS, and the like is presumed.

System 100 may also include one or more servers 121 and 131 (and other servers, which are not illustrated), which may be any suitable server, processor, computer, or data processing device, or combination of the same. Servers 121 and/or 131 may each be owned, managed, and/or operated by a particular team and/or business unit. Servers 121 and/or 131 may be connected by one or more communications links 181 and 183 to network 151. As will be described in further detail in the examples below, servers 121 and 131 may communicate, via a communication session, data (e.g., computing tasks or data relating to computing tasks) to other devices, such as the task management computing device 101, user devices 151 (e.g., laptop, workstation, mobile device, and the like), and/or or other devices. Any of the elements in FIG. 1 may be implemented as one or more computing device, such as the example computing device 201 described in connection with FIG. 2 below.

Network 151 may be any suitable network including a cloud network, the Internet, an intranet, a wide-area network (WAN), a local-area network (LAN), a wireless network, a digital subscriber line (DSL) network, a frame relay network, an asynchronous transfer mode (ATM) network, a virtual private network (VPN), a cellular network, or any combination of any of the same. The network 151 may comprise one or more nodes (e.g., server nodes) and/or node clusters for executing one or more tasks. Communications links 181, 183, 185, 187, or other communication links may be any communications links suitable for communicating among the task management computing device 101, servers 121 and 131, user devices 151, and/or other devices, such as network links, dial-up links, wireless links, hard-wired links, or other communications links.

The user device 151 may be used, such as by a user associated with the server 121 and/or server 131, to receive task and/or task-related information. The user device 151 may include input devices for receiving user input, such as a touchscreen display, a physical keyboard, a microphone, a mouse, and the like. For example, the user interface 500 illustrated in FIG. 5, which will be described in further detail below, may be used to receive the task and/or task-related information from a user. The user device 151 may transmit the task and/or task-related information to the task management computing device 101.

The system 100 may also comprise a task registry 161. The task registry 161 may be used to receive and/or store task information, which may be executed in the future. In some aspects, the task registry 161 may be part of the task management computing device 101 and/or may be part of a different computing device located at a different location from the task management computing device 101. The task registry 161 may comprise, for example, a registry table used to identify and/or define tasks and to store parameters for tasks.

The system 100 may also comprise a dependent task registry 163. The dependent task registry 163 may be used to receive and/or store dependent task information, which may be executed in the future (or may have been executed in the past). In some aspects, the dependent task registry 163 may be part of the task management computing device 101 and/or may be part of a different computing device located at a different location from the task management computing device 101. The dependent task registry 163 may comprise, for example, a dependent registry table used to identify and/or define dependent tasks and to store parameters for dependent tasks.

The system 100 may also comprise a task queue 171. The task queue 171 may be used to receive, such as from the task registry 161, tasks to be executed. The task queue 171 may be part of the task management computing device 101 and/or may be part of a different computing device located at a different location from the task management computing device 101. When a task is ready to be executed, the task queue 171 may send the task to one or more node or node cluster 141 of the network 151 for execution. The task queue 171 may be used to manage active tasks (e.g., tasks currently being executed) and/or tasks waiting to be executed. Load balancing may be used to select the node 141 or node cluster(s) to execute a task.

The system 100 may also comprise a dependent task queue 173. The dependent task queue 173 may be used to receive, such as from the dependent task registry 163, dependent tasks to be executed (or an indication of dependent tasks already executed). The dependent task queue 173 may be part of the task management computing device 101 and/or may be part of a different computing device located at a different location from the task management computing device 101. When a dependent task is ready to be executed, the dependent task queue 173 may send the dependent task to one or more node or node cluster 141 of the network 151 for execution. The dependent task queue 173 may be used to manage active dependent tasks (e.g., dependent tasks currently being executed) and/or tasks waiting to be executed. Load balancing may be used to select the node 141 or node cluster(s) to execute a dependent task.

Figure 2:
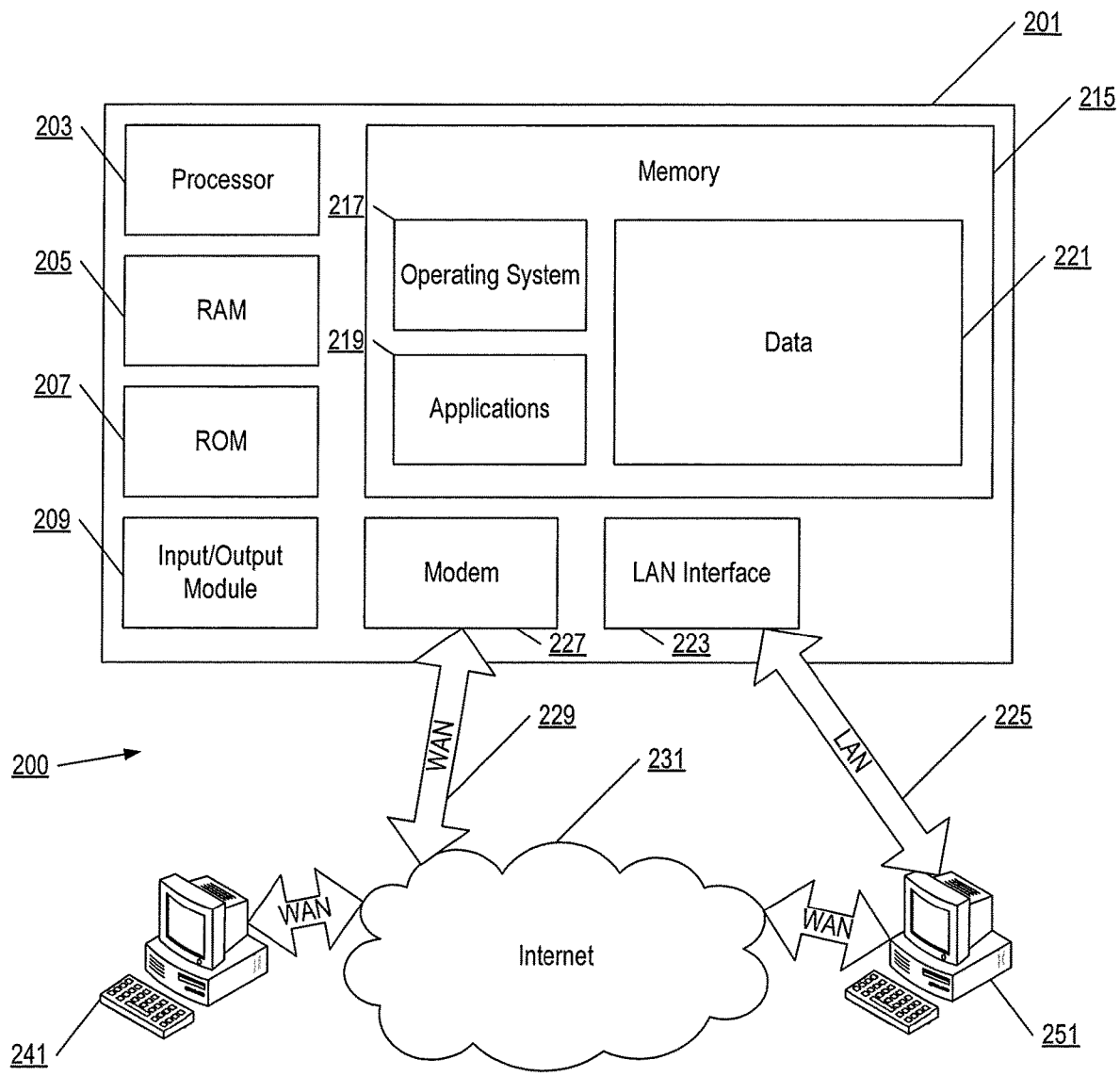
FIG. 2 illustrates another example operating environment in which various aspects of the disclosure may be implemented.

FIG. 2 illustrates an example block diagram of a computing device 201 (e.g., a computer server, desktop computer, laptop computer, tablet computer, other computing devices) in an example computing environment 200 that may be used according to one or more illustrative embodiments of the disclosure. The computing device 201 may have a processor 203 for controlling overall operation of the server and its associated components, including for example random access memory (RAM) 205, read-only memory (ROM) 207, input/output (I/O) module 209, and memory 215.

I/O module 209 may include, e.g., a microphone, mouse, keypad, touch screen, scanner, optical reader, and/or stylus (or other input device(s)) through which a user of computing device 201 may provide input, and may also include one or more of a speaker for providing audio output and a video display device for providing textual, audiovisual, and/or graphical output. Software may be stored within memory 215 and/or other storage to provide instructions to processor 203 for enabling computing device 201 to perform various functions. For example, memory 215 may store software used by the computing device 201, such as an operating system 217, application programs 219, and an associated database 221. Additionally or alternatively, some or all of the computer executable instructions for computing device 201 may be embodied in hardware or firmware (not shown).

The computing device 201 may operate in a networked environment supporting connections to one or more remote computers, such as terminals 241 and 251. The terminals 241 and 251 may be personal computers or servers that include any or all of the elements described above with respect to the computing device 201. The network connections depicted in FIG. 2 include a local area network (LAN) 225 and a wide area network (WAN) 229, but may also include other networks. When used in a LAN networking environment, the computing device 201 may be connected to the LAN 225 through a network interface or adapter 223. When used in a WAN networking environment, the computing device 201 may include a modem 227 or other network interface for establishing communications over the WAN 229, such as the Internet 231. It will be appreciated that the network connections shown are illustrative and other means of establishing a communications link between the computers may be used. The existence of any of various well-known protocols such as TCP/IP, Ethernet, FTP, HTTP, HTTPS, and the like is presumed. Computing device 201 and/or terminals 241 or 251 may also be mobile devices (e.g., mobile phones, smartphones, PDAs, notebooks, tablets, other mobile devices) including various other components, such as a battery, speaker, and antennas.

Figure 3:
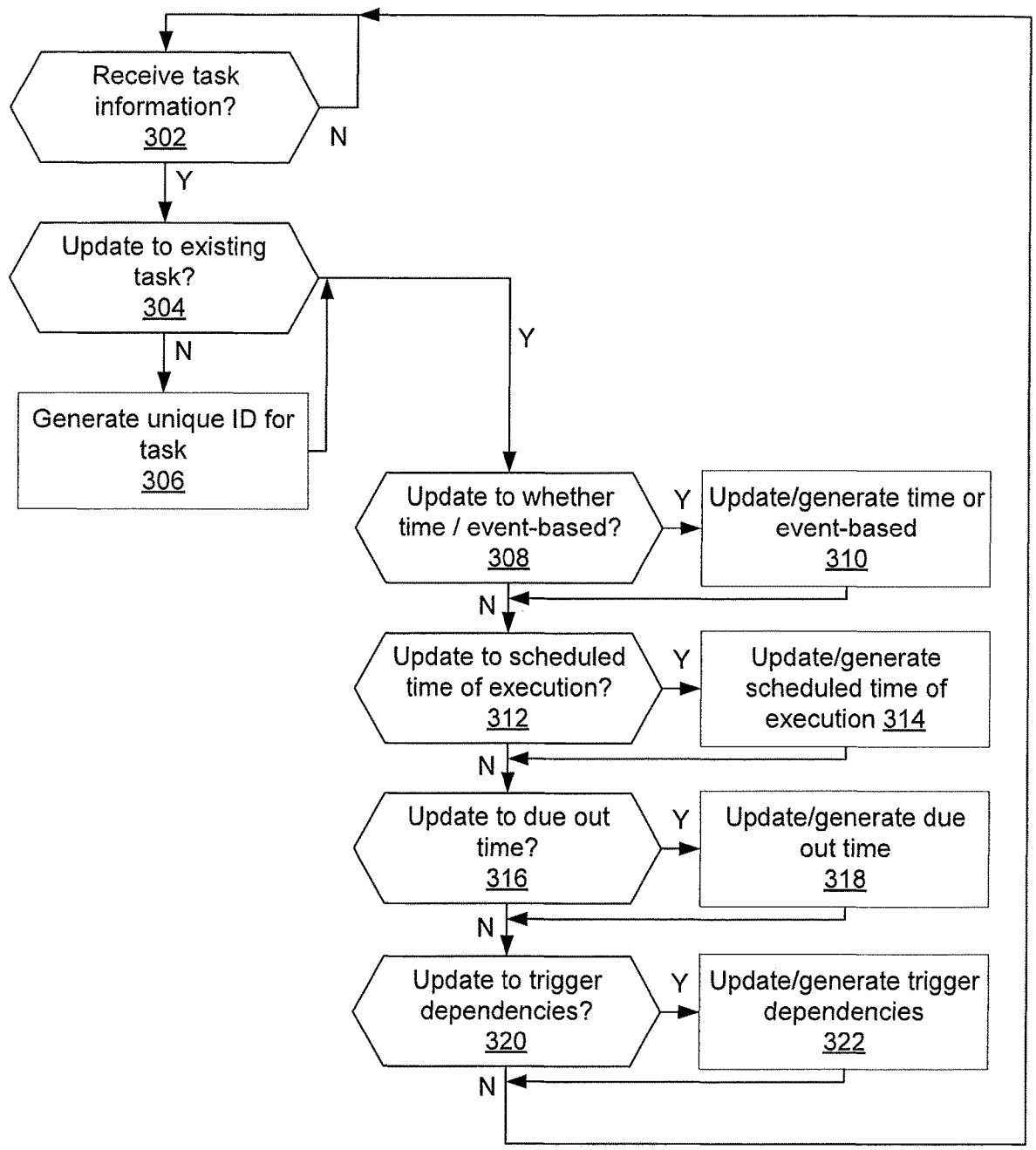
FIG. 3 illustrates an example of at least a portion of a flow diagram for triggering, managing, and/or controlling computing tasks based on events and/or time factors in which various aspects of the disclosure may be implemented.

FIG. 3 illustrates an example of at least a portion of a flow diagram for triggering, managing, and/or controlling computing tasks based on events and/or time factors in which various aspects of the disclosure may be implemented.

In step 302, the task management computing device 101 may determine whether it received task information. For example, the computing device 101 may receive task information from a server 121 or server 131 (e.g., in an automated process) or may receive task information from a user device 151, which may be inputted by a user of the user device 151. If the computing device 101 has not received task information (step 302: N), the computing device 151 may wait to receive task information. If the computing device 101 determines it has received task information (step 302: Y), the computing device 101 may proceed to step 304. Task information may comprise, for example, a unique identifier for a task, a description for the task, an indication of whether the task is time-based (e.g., triggered by time) or event-based (e.g., triggered by other the execution of other task(s)), a scheduled time for executing the task, a due out time for the task, event trigger dependencies for the task (e.g., which tasks are to be executed, whether initiated or completed, prior to execution of the current task), and/or other information relating to a task. As will be described in further detail below, after task information is updated or generated, the task management computing device 101 may store, such as in the task registry 161 and/or the dependent task registry 163, the task information in association with the task (e.g., via the unique identifier for the task). In some aspects, entries in a task registry 161 table or dependent task registry 163 table may be used to store values for each piece of task information. For example, a column with associated entries may be used to indicate one or more trigger dependencies, another column may be used to indicate the due out time for the task, and another column may be used to indicate the scheduled time of execution for the task.

In step 304, the task management computing device 101 may determine whether the received task information relates to an update to an existing task. If the received information relates to an update to an existing task (step 304: Y), the computing device 101 may proceed to step 308. If the received task information does not relate to an update to an existing task (step 304: N), the computing device may determine that the information relates to a new task and proceed to step 306.

In step 306, the task management computing device 101 may generate a unique identifier for the new task. The unique identifier may be any alphanumeric combination of characters used to distinguish a task from other tasks in the system 100 or managed by the computing device 101. The unique task identifier may be used to, for example, prevent the creation of duplicate tasks.

In step 308, the task management computing device 101 may determine whether to update (e.g., for an existing task) or generate (e.g., for a new task or an existing task without an indication of whether the task is time or event-based) an indication of whether the task is triggered by a time or an event (e.g., initiation or completion of another task). If the computing device 101 determines to update or generate the indication of whether the task is time or event-based (step 308: Y), the computing device 101 may update or generate the indication of whether the task is time or event-based in step 310. If the computing device 101 determines that the received task information does not indicate whether the task is time or event-based (step 308: N), the computing device 101 may proceed to step 312.

In step 312, the task management computing device 101 may determine whether to update (e.g., for an existing task) or generate (e.g., for a new task or an existing task without a time of execution) a scheduled time of execution. In some aspects, tasks may be triggered by a predefined time schedule, and the time of execution may indicate a time to execute a particular task, such as if the task is triggered by the current time exceeding the time of execution. If the computing device 101 determines to update or generate the time of execution (step 312: Y), the computing device 101 may update or generate the time of execution for the task in step 314. If the computing device 101 determines that the received task information does not indicate a time of execution for the task (step 312: N), the computing device 101 may proceed to step 316.

In step 316, the task management computing device 101 may determine whether to update (e.g., for an existing task) or generate (e.g., for a new task or an existing task without a time of completion) a due out time for the task. For example, the system 100 may execute a task (or mark the task as complete) so that it is completed before a particular time (e.g., 4 PM) or spends a particular amount of time in the task queue (e.g., 10 minutes), even if the time-based or event-based triggers for the task have not yet occurred. Accordingly, the due out time may act as an override for the time-based or event-based triggers in some aspects. For example, a task may become stale if it remains in the task queue 171 without being executed for more than a threshold amount of time (e.g., 3 days). The due out time parameter may be used to prevent stale tasks from using bandwidth and/or processing resources in the task queue 171. If the computing device 101 determines to update or generate the due out time (step 316: Y), the computing device 101 may update or generate the due out time for the task in step 318. If the computing device 101 determines that the received task information does not indicate a due out time for the task (step 316: N), the computing device 101 may proceed to step 320.

In step 320, the task management computing device 101 may determine whether to update (e.g., for an existing task) or generate (e.g., for a new task or an existing task without trigger dependencies) trigger dependencies for the task, such as other tasks to be completed, executed, and/or initiated before executing the task. In an exemplary many-to-one task dependency scenario, 3 tasks (e.g., dependent tasks) may have to be executed (e.g., initiated and/or completed) before another task is to be executed. In an exemplary many-to-many task dependency scenario, 3 tasks (e.g., dependent tasks) may have to be executed before another 5 tasks are to be executed. In an exemplary one-to-many task dependency, 1 task may have to be executed before another 4 tasks are to be executed. For example, the task may trigger the execution of 4 other tasks. If the computing device 101 determines to update or generate the trigger dependencies (step 320: Y), the computing device 101 may update or generate the trigger dependencies in step 322. If the computing device 101 determines that the received task information does not indicate an update to trigger dependencies (step 320: N), the computing device 101 may return to step 302 to determine whether the computing device 101 has received task information for another task. In some aspects, the computing device 101 may validate any of the task information previously described prior to storing the task information in, for example, the task registry 161 and/or the dependent task registry 163.

FIG. 5 illustrates an example user interface 500 for triggering, managing, and/or controlling computing tasks based on events and/or time factors in which various aspects of the disclosure may be implemented. In some aspects, a user, via a user device 151, may update or provide one or more parameters (e.g., task information previously described) for tasks via the user interface 500. For example, the user may select 502 whether the task is a new task or an existing task, such as via a drop down menu or another graphical user interface element. In some aspects, a unique task identifier 504 may be generated and/or displayed to the user. The user may provide a task description 508 for the task, such as "This task is used to execute action 1." The task description may comprise, for example, a sentence or phrase that a user, such as a user of the user device 151, can use to recognize the task. In some aspects, the user might not be provided with the option to update or create the task description 508. The user may provide a task event trigger 510, which may identify a task (e.g., TASK1357) to be executed (e.g., initiated or completed) prior to execution of the current task (e.g., TASK123456). The user may select one or more dependent tasks via a drop down menu or another graphical user interface. The drop down menu may list, for example, existing tasks. In some aspects, the user may select an option to add more dependencies, such as additional tasks to be executed prior to execution of the current task. Accordingly, a many-to-one task dependency may be implemented by the system described herein. The user may provide a task time trigger 512, which may indicate the time and/or date for the task to be executed, such as if the task is a time-based task. The user may select an option 514 to submit the updated parameter values (or new parameter values) for the task. In response, the computing device 101 may store the updated and/or new parameter values in a database, such as in the task registry 161 and/or dependent task registry 163.

Figure 4:
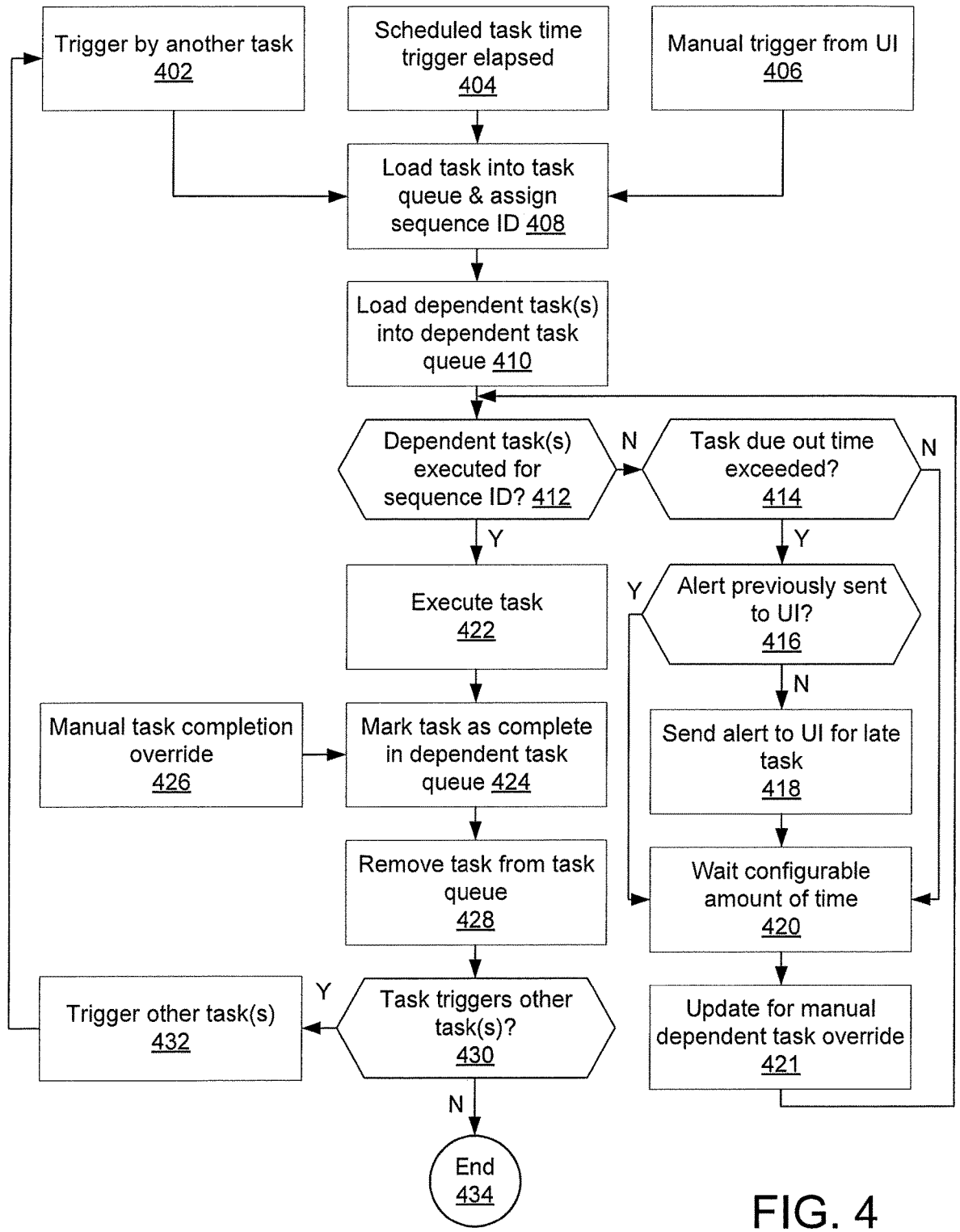
FIG. 4 illustrates another example of at least a portion of a flow diagram for triggering, managing, and/or controlling computing tasks based on events and/or time factors in which various aspects of the disclosure may be implemented.

FIG. 4 illustrates another example of at least a portion of a flow diagram for triggering, managing, and/or controlling computing tasks based on events and/or time factors in which various aspects of the disclosure may be implemented. Execution of a task may be triggered by one or more events. In some aspects, a task may be triggered by another task. As previously described, a task may comprise a task that is triggered by the execution (e.g., initiation or completion) of one or more other tasks. A task may be triggered based on a schedule, such as if a scheduled task time trigger elapses. In some aspects, a task may be triggered manually, such as from a user device and/or user interface (UI).

In step 402, the task management computing device 101 may determine whether execution of a task is triggered by another task (e.g., the execution, such as completion or initiation, of the other task). The trigger or dependent task(s) may comprise task(s) that are to be executed prior to execution of the current task. If the current task has been triggered by the execution of another task, the computing device 101 may proceed to step 408. Otherwise, the computing device 101 may wait for one or more trigger task to execute.

In step 404, the task management computing device 101 may determine whether execution of a task is triggered based on a schedule, such as a scheduled time of execution. The scheduled time of execution may comprise a time, that if exceeded, causes the computing device 101 to execute the task. The scheduled time, which may be a predetermined time, may be modified by a user of the user device 151. In some aspects, the scheduled time of execution may comprise a time of day or a time period (e.g., every 15 minutes or every Thursday). Some tasks may include a scheduled execution time, and other tasks might not include a scheduled override time. In some aspects, the task management computing device 101 may determine whether the current time exceeds the scheduled time for executing the task. If the task has been triggered by the scheduled time of execution, the computing device 101 may proceed to step 408. If the current time does not exceed the scheduled time for executing the task or the task does not have a scheduled time for execution, the computing device may wait to receive a trigger for executing the task.

In some aspects, the task management computing device 101 may determine available processing resources, such as one or more server nodes 141 or node clusters in the network 151, for executing the task. For example, the computing device 101 may determine the load of the available processing resources for executing the task in the queue 171. The task management computing device 101 may determine, based on the available processing resources, the amount of time to complete the task. For example, if the nodes 141 identified for executing the task are overloaded (e.g., have loads that exceed threshold loads), the amount of time to complete execution of the task may be higher. On the other hand, if the nodes 141 identified for executing the task are lightly loaded (e.g., have loads that are below threshold loads), the amount of time to complete execution of the task may be lower. The computing device 101 may estimate the amount of time to complete the task. The task management computing device 101 may determine, based on the amount of time to complete the task and based on an end time for completing the task, a latest time to execute the task. For example, if the end time for completing the task is 3 PM EST, and the amount of time to complete the task is 25 minutes, the computing device 101 may determine the latest time to execute the task (e.g., the latest time to execute the task) as 2:35 PM.

In some aspects, the latest time to execute the task may comprise the scheduled time to execute the task. In these examples, the task management computing device 101 may determine whether the current time exceeds the latest time to execute the task. If the current time exceeds the latest time to execute the task, the computing device 101 may proceed to step 408 to attempt to execute the task. If the current time does not exceed the latest time to execute the task, the computing device 101 may wait for a trigger.

In step 406, the task management computing device 101 may determine whether it received a manual task trigger from a user device and/or user interface. In some aspects, a user of the user device 151 may provide a manual or override instruction to execute a task. The user device 151 may transmit the override instruction to the computing device 101. If the task has been triggered by a manual task trigger (e.g., the computing device 101 received the trigger from the user device 151 and/or user interface), the computing device 101 may proceed to step 408 to attempt to execute the current task. If a manual override has not been received, the computing device may wait for a trigger for the current task. In some aspects, the computing device 101 may perform steps 402, 404, and/or 406 in parallel. For example, some tasks may include one or more task trigger, one or more time trigger, and/or one or more manual override trigger, and the computing device 101 may monitor for each of the triggers.

In step 408, the task management computing device 101 may move (e.g., load) the task into a task queue 171. For example, the task management computing device 101 may move information for the task (e.g., task identifier, task dependencies, and the like) from the task registry 161 to the task queue 171. The task management computing device 101 may also determine (e.g., generate) a task sequence identifier (e.g., a number, such as a binary number) for the task. The generated task sequence identifier may comprise a unique task sequence identifier and may be stored into the associated task queue 171. The task sequence identifier may be used to later identify, for example, the correct table entries for subsequent updates. The sequence identifier may be used to group a plurality of tasks, with each task in the group having the same sequence identifier. In some aspects, the task sequence identifier might be un-modifiable.

As previously described, one or more tasks may be moved to the task queue 171 based on one or more triggers, such as at certain times of the day (e.g., at predetermined times). In some aspects, the task may be moved in response to a determination that the task will be executed in the future, such as near future. The determination that the task will be executed in the near future may comprise a determination that the current time is within a threshold time that the task is expected to be executed. The determination that the task will be executed in the near future may additionally or alternatively comprise a determination that one or more dependent tasks (e.g., tasks having an earlier sequence number than the task in question) has been initiated and/or will be completed within a threshold amount of time. For example, if the task in question is to be executed fourth in a series of tasks, the task management computing device 101 may determine that the dependent task immediately preceding the task in question (e.g., the task to be executed third) has been initiated, is 50% complete, or is expected to be completed within a threshold amount of time.

In step 410, the task management computing device 101 may load one or more dependent task(s) into the dependent task queue 173. That is, the task management computing device 101 may move information for dependent tasks from the dependent task registry 163 to the dependent task queue 173. For example, the dependencies for the task loaded into the task queue 171 (e.g., in step 408) may be loaded into the dependent task queue 173, and may be associated with the same task sequence identifier that was generated (e.g., in step 408) for the task loaded into the task queue 171. In some aspects, a task might not have any dependent tasks. In these scenarios, the computing device 101 might not load dependent tasks into the dependent task queue.

In step 412, the task management computing device 101 may determine whether the dependent task(s) for the sequence identifier have been executed (e.g., completed). For example, the task in the task queue 171 may be verified to determine whether the task's dependencies have been completed (e.g., from the associated dependent task queue). If the dependent task(s) for the sequence identifier have been executed (step 412: Y), the computing device 101 may proceed to step 422 to execute the task in the task queue 171, as will be described in further detail below. If the dependent task(s) for the sequence identifier have not been executed (step 412: N), the computing device 101 may proceed to step 414.

In step 414, the task management computing device 101 may determine whether a task due out time has been exceeded. For example, a task may comprise an indicator for which the task may become stale (e.g., after sitting in the queue 3 days). If the task is in the queue and has not been executed by the due out time, the computing device 101 may determine, in step 414, that the task due out time has been exceeded. If the task due out time has not been exceeded (step 414: N), the computing device 101 may proceed to step 420, as will be described in further detail below. If the task due out time has been exceeded (step 414: Y), the computing device 101 may proceed to step 416.

In step 416, the task management computing device 101 may determine whether an alert has previously been sent to the user device 151 and/or a user interface. If the alert was previously sent to the user device 151 and/or a user interface (step 416: Y), the computing device 101 may proceed to step 420. If the alert has not been sent to the user device 151 and/or a user interface (step 416: N), the computing device 101 may proceed to step 418.

In step 418, the task management computing device 101 may transmit an alert to the user device 151 and/or a user interface, and the alert may indicate that a task is late. In some aspects, the alert may indicate that the due out time has been exceeded for the task and that task execution is now late. In some aspects, the user may manually resolve the unexecuted task, such as by marking the task as complete or manually instructing, via the user device 151, the computing device 101 to execute that task.

In step 420, the task management computing device 101 may wait an amount of time, which may be configurable. A user of the user device 151 may configure the amount of time to wait in step 420.

In step 421, the task management computing device 101 may determine whether a manual override for a dependent task has been received (e.g., for a dependent task having the sequence ID of the task in the task queue 171). If a manual override for a dependent task has been received, the computing device 101 may update the dependency data (e.g., to mark the dependent task as completed). The computing device 101 may return to step 412 to again check the status of the task and eligibility for execution.

In step 422, the task management computing device 101 may execute (or cause execution of) the task in the task queue 171 if the task is eligible for execution. For example, the dependent task(s) for the sequence ID of the task in the task queue 171 may have been executed. The computing device 101 may assign the task to one or more processing resources (e.g., a server node 141 or cluster of server nodes) and may instruct the server node(s) 141 to execute the task.

In step 424, the task management computing device 101 may mark the task as complete in the dependent task queue 173. For example, other tasks in the queues containing this completing task as a dependency may have the dependency set to complete. Marking the task as complete may trigger the execution of one or more other tasks. The task management computing device 101 may continue to step 428, as will be described in further detail below.

In some aspects, in step 426, the task management computing device 101 may determine whether it has received a manual task completion override, such as from the user device 151 and/or a UI. The manual completion override received from a UI may comprise an operator action. If a manual task completion override has been received, the computing device 101 may proceed to step 424, as previously described.

In step 428, the task management computing device 101 may remove the executed task from the task queue 171. In some aspects, the removal may comprise a virtual removal of the task, such that the task remains in the task queue 171, but the task is marked as complete. By maintaining the task in the task queue 171, a record of task execution and associated data (e.g., time of execution, duration of execution, bandwidth and/or resources used, and other data) may be created.

In step 430, the task management computing device 101 may determine whether the executed task triggers one or more other tasks. That is, the computing device 101 may determine whether or not the completing task is to trigger one or more other tasks. If not (step 430: N), the computing device 101 may continue to step 434. Otherwise, the computing device may proceed to step 432.

In step 432, the task management computing device 101 may trigger one or more other tasks (e.g., a plurality of tasks), such that the one or more other tasks are marked to be added to the task queue 171. For example (and as previously described with respect to step 402), the completing task may trigger the tasks as configured within the task registry 161 to be brought into the task queues. The task management computing device 101 may continue to step 402 for these other triggered tasks.

Otherwise, in step 434, the task management computing device 101 may end the process for the completed task. That is, the completing task may come to the end of its processing, and no further activity is taken for the task.

Various aspects described herein may be embodied as a method, an apparatus, or as computer-executable instructions stored on one or more non-transitory and/or tangible computer-readable media. Any and/or all of the method steps described herein may be embodied in computer-executable instructions stored on a computer-readable medium, such as a non-transitory and/or tangible computer readable medium and/or a computer readable storage medium. Additionally or alternatively, any and/or all of the method steps described herein may be embodied in computer-readable instructions stored in the memory and/or other non-transitory and/or tangible storage medium of an apparatus that includes one or more processors, such that the apparatus is caused to perform such method steps when the one or more processors execute the computer-readable instructions. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. A system comprising:
a task registry;
a task queue;
a dependent task queue;
a user device configured to:
receive, from a user, task information, the task information including dependency information about a plurality of dependent computing tasks for a first computing task; and
transmit, to a computing device, the task information about the plurality of dependent computing tasks for the first computing task;
the computing device comprising:
a processor; and
memory storing computer-executable instructions that, when executed by the processor, cause the computing device to:
receive, from the user device, the task information, the task information including dependent task information about the plurality of dependent computing tasks, wherein all of the plurality of dependent computing tasks must have executed before executing the first computing task;
store, at the task registry and in association with the first computing task, the task information;
generate a single sequence number to group the first computing task with a plurality of computing tasks, wherein the single sequence number comprises a binary number indicative of an execution time of the first computing task;
cause a first transmission of about the first computing task from the task registry to the task queue;
cause a second transmission of the plurality of dependent computing tasks from the task registry to the dependent task queue, wherein the causing the first transmission of the first computing task from the task registry to the task queue is performed before the causing the second transmission of the plurality of dependent computing tasks from the task registry to the dependent task queue;
determine whether the plurality of dependent computing tasks associated with the single sequence number has been executed wherein the first computing task is executed after the plurality of dependent computing tasks is executed; and
when the plurality of dependent computing tasks has been executed, determine one or more nodes for executing the first computing task and cause transmission of an execution request of the first computing task from the task queue to the one or more nodes for executing the first computing task; and
the one or more nodes configured to:
execute the first computing task in response to receiving the first computing task from the task queue.

2. The system of claim 1, wherein the determining whether the plurality of dependent computing tasks has been executed comprises determining whether execution of the plurality of dependent computing tasks has been completed by one or more nodes.

3. The system of claim 1, wherein the determining whether the plurality of dependent computing tasks has been executed comprises determining whether execution of the plurality of dependent computing tasks has been initiated by one or more nodes.

4. The system of claim 1, wherein the memory of the computing device stores computer-executable instructions that, when executed by the processor, cause the computing device to:
determine whether the computing device has received a manual override from the user device; and
if the computing device has received the manual override from the user device, determine one or more nodes for executing the first computing task and cause transmission of the first computing task from the task queue to the one or more nodes for executing the first computing task.

5. The system of claim 1, wherein the memory of the computing device stores computer-executable instructions that, when executed by the processor, cause the computing device to:
determine whether a current time exceeds a scheduled time to execute the first computing task; and
if the current time exceeds the scheduled time to execute the first computing task, determine one or more nodes for executing the first computing task and cause transmission of the first computing task from the task queue to the one or more nodes for executing the first computing task.

6. The system of claim 1, wherein the memory of the computing device stores computer-executable instructions that, when executed by the processor, cause the computing device to:
determine one or more nodes for executing the first computing task;
determine, based on the one or more nodes for executing the first computing task, an amount of time to complete execution of the first computing task; and
determine, based on the amount of time to complete execution of the first computing task, a latest time to execute the first computing task.

7. The system of claim 1, wherein the memory of the computing device stores computer-executable instructions that, when executed by the processor, cause the computing device to:
identify an entry in the task queue for the first computing task based on the single sequence number; and
in response to the identifying, update the identified entry for the first computing task.

8. The system of claim 1, wherein the memory of the computing device stores computer-executable instructions that, when executed by the processor, cause the computing device to:
when the first computing task is expected to be executed within a predetermined threshold time from a current time, move the first computing task to the task queue.

9. A method comprising:
receiving, by a computing device and from a user device, task information, the task information including dependency information about a plurality of dependent computing tasks for a first computing task, wherein all of the plurality of dependent computing tasks must have executed before executing the first computing task;
storing, by the computing device, at a task registry, and in association with the first computing task, the task information;

generating a single sequence number to group the first computing task with a plurality of computing tasks, wherein the single sequence number comprises a binary number indicative of an execution time of the first computing task;

causing, by the computing device, a first transmission of the first computing task from the task registry to a task queue;

causing a second transmission of the plurality of dependent computing tasks from the task registry to a dependent task queue, wherein the causing the first transmission of the first computing task from the task registry to the task queue is performed before the causing the second transmission of the plurality of dependent computing tasks from the task registry to the dependent task queue;

determining, by the computing device, whether the plurality of dependent computing tasks associated with the single sequence number has been executed, wherein the first computing task is executed after the plurality of dependent computing tasks is executed;

when the plurality of dependent computing tasks has been executed, determining, by the computing device, one or more nodes for executing the first computing task and causing, by the computing device, transmission of an execution request of the first computing task from the task queue to the one or more nodes for executing the first computing task; and executing, by the one or more nodes, the first computing task in response to receiving the first computing task from the task queue.

10. The method of claim 9, wherein the determining whether the plurality of dependent computing tasks has been executed comprises determining whether execution of the plurality of dependent computing tasks has been completed by one or more nodes.

11. The method of claim 9, wherein the determining whether the plurality of dependent computing tasks has been executed comprises determining whether execution of the plurality of dependent computing tasks has been initiated by one or more nodes.

12. The method of claim 9, further comprising:
determining, by the computing device, whether the computing device has received a manual override from the user device; and
if the computing device has received the manual override from the user device, determining, by the computing device, one or more nodes for executing the first computing task and causing, by the computing device, transmission of the first computing task from the task queue to the one or more nodes for executing the first computing task.

13. The method of claim 9, further comprising:
determining, by the computing device, whether a current time exceeds a scheduled time to execute the first computing task; and
if the current time exceeds the scheduled time to execute the first computing task, determining, by the computing device, one or more nodes for executing the first computing task and causing, by the computing device, transmission of the first computing task from the task queue to the one or more nodes for executing the first computing task.

14. The method of claim 9, further comprising:
determining, by the computing device, one or more nodes for executing the first computing task;

determining, by the computing device and based on the one or more nodes for executing the first computing task, an amount of time to complete execution of the first computing task; and
determining, by the computing device and based on the amount of time to complete execution of the first computing task, a latest time to execute the first computing task.

15. The method of claim 9, wherein a second computing task has a dependency on the first computing task and the second computing task is in the task queue, the method further comprising:
when the first computing task completes execution, marking the first computing task as complete in the dependent task queue.

16. The method of claim 9, the method further comprising:
when the first computing task completes execution, triggering a third computing task; and
in response to the triggering, repeating the receiving, the storing, the causing the first transmission, the causing the second transmission, the determining whether the plurality of dependent computing tasks has been executed, and the determining one or more modes for executing for the third computing task.

17. The method of claim 9, the method further comprising:
when the first computing task completes execution, virtually removing the first computing task from the task queue, wherein the first computing task remains in the task queue and is marked as complete.

18. A non-transitory computer readable medium storing instructions thereon that, when read by a computing device, causes the computing device to:
receive, from a user device, task information, wherein the task information includes dependency information about a plurality of dependent computing tasks for a first computing task, wherein all of the plurality of dependent computing tasks must have executed before executing the first computing task;
store, at a task registry and in association with the first computing task, the task information;
generate a single sequence number to group the first computing task with a plurality of computing tasks, wherein the single sequence number comprises a binary number indicative of an execution time of the first computing task;
cause a first transmission of the first computing task from the task registry to a task queue;
cause a second transmission of the plurality of dependent computing tasks from the task registry to a dependent task queue, wherein the causing the first transmission of the first computing task from the task registry to the task queue is performed before the causing the second transmission of the plurality of dependent computing tasks from the task registry to the dependent task queue;
determine whether the plurality of dependent computing tasks associated with the single sequence number has been executed, wherein the first computing task is executed after the plurality of dependent computing tasks is executed;
when the plurality of dependent computing tasks has been executed, determine one or more nodes for executing the first computing task and cause transmission of an execution request of the first computing task from the task queue to the one or more nodes for executing the first computing task; and execute, by the one or more nodes, the first computing task in response to receiving the first computing task from the task queue.

19. The non-transitory computer readable medium of claim 18, wherein the determining whether the plurality of dependent computing tasks has been executed comprises determining whether execution of the plurality of dependent computing tasks has been completed by one or more nodes.

20. The non-transitory computer readable medium of claim 18, wherein the determining whether the plurality of dependent computing tasks has been executed comprises determining whether execution of the plurality of dependent computing tasks has been initiated by one or more nodes.

21. The non-transitory computer readable medium of claim 18, storing instructions thereon that, when read by the computing device, causes the computing device to:

determine whether the computing device has received a manual override from the user device; and if the computing device has received the manual override from the user device, determine one or more nodes for executing the first computing task and cause transmission of the first computing task from the task queue to the one or more nodes for executing the first computing task.

22. The non-transitory computer readable medium of claim 18, storing instructions thereon that, when read by the computing device, causes the computing device to:

determine whether a current time exceeds a scheduled time to execute the first computing task; and if the current time exceeds the scheduled time to execute the first computing task, determine one or more nodes for executing the first computing task and cause transmission of the first computing task from the task queue to the one or more nodes for executing the first computing task.

* * * * *

UNITED STATES PATENT AND TRADEMARK OFFICE
CERTIFICATE OF CORRECTION

PATENT NO. : 11,119,828 B2  
APPLICATION NO. : 16/516491  
DATED : September 14, 2021  
INVENTOR(S) : LaRock et al.

Page 1 of 1

It is certified that error appears in the above-identified patent and that said Letters Patent is hereby corrected as shown below:

In the Claims

Column 13, Line 39:
In Claim 1, before "the first", delete "about"

Signed and Sealed this  
Twenty-eighth Day of December, 2021

Drew Hirshfeld  
*Performing the Functions and Duties of the*  
*Under Secretary of Commerce for Intellectual Property and*  
*Director of the United States Patent and Trademark Office*